(12) United States Patent
Harter, Jr. et al.

(10) Patent No.: US 6,646,810 B2
(45) Date of Patent: Nov. 11, 2003

(54) DISPLAY BACKLIGHTING APPARATUS

(75) Inventors: Joseph E. Harter, Jr., Kokomo, IN (US); Gregory K. Scharenbroch, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/097,811

(22) Filed: Mar. 14, 2002

(65) Prior Publication Data

US 2003/0043470 A1 Mar. 6, 2003

Related U.S. Application Data

(60) Provisional application No. 60/317,001, filed on Sep. 4, 2001.

(51) Int. Cl.$^7$ .............................................. G02B 27/14
(52) U.S. Cl. ......................................... 359/630; 359/13
(58) Field of Search .................. 359/13, 630; 345/102; 349/61, 62, 67

(56) References Cited

U.S. PATENT DOCUMENTS

| 5,709,463 | A | | 1/1998 | Igram .......................... 362/268 |
| 5,889,567 | A | * | 3/1999 | Swanson et al. ............... 349/62 |
| 6,304,308 | B1 | * | 10/2001 | Saito et al. ................... 349/155 |
| 6,411,353 | B1 | * | 6/2002 | Yarita et al. .................... 349/59 |
| 6,504,587 | B1 | * | 1/2003 | Morishita et al. .............. 349/58 |
| 6,560,018 | B1 | * | 5/2003 | Swanson ....................... 359/569 |

* cited by examiner

*Primary Examiner*—Jordan M. Schwartz
*Assistant Examiner*—Jessica Stultz
(74) *Attorney, Agent, or Firm*—Stefan V. Chmielewski

(57) ABSTRACT

An image illumination apparatus for backlighting a portion of a liquid crystal display. The apparatus includes a light source generating an illuminating light, a light shielding medium located between the light source and a display grid, and an aperture formed in the light shielding medium for allowing the transmission of light generated by the light source to pass to a lighted portion of the display grid. The light shielding medium prevents light from being transmitted to a non-lighted portion of the display grid.

25 Claims, 4 Drawing Sheets

DISPLAY BACKLIGHTING APPARATUS

CROSS REFERENCE TO RELATED APPLICATION

This application claims the benefit of U.S. Provisional Application No. 60/317,001, filed Sep. 4, 2001.

TECHNICAL FIELD

The present invention generally relates to lighted displays for displaying images, and more particularly to the backlighting of image generating displays, such as active matrix liquid crystal displays which are useful for head up displays.

BACKGROUND OF THE INVENTION

Electronic image displays are commonly illuminated by backlighting the display for direct viewing from the front or for viewing in a head up display (HUD) system. HUD systems have been widely known and used in military and commercial aircraft applications. More recently, HUD systems have been employed in automotive vehicles to project an image for display in front of the vehicle driver so that the image is viewable through the front windshield. The HUD system thus serves as an alternative to displaying the image on a display unit generally located in the instrument panel of the vehicle.

In automotive applications, passive displays, such as active matrix liquid crystal displays (AMLCD), are illuminated by applying backlight illumination to the backside of the electronic display. Since HUDs typically project a light pattern generated by an image source and reflect the light pattern from a windshield generally having a low reflectivity, it becomes necessary to provide a high intensity light source, especially during daylight driving conditions which demand a very bright image source. Typically, the image source for a HUD includes a halogen bulb and an elliptical reflector such as is disclosed in U.S. Pat. No. 5,709,463. The aforementioned patent is hereby incorporated by reference.

In many conventional HUD systems, multiple images are generated by a single electronic display and only a portion of the display grid is actually used to project the images. The remaining portion of the display grid, which is not used to display any image, is generally colored black. With conventional backlighting approaches, the light pattern is generally configured to illuminate the entire backside of the electronic display grid. Accordingly, not only is the lighted portion of the display grid illuminated, but the black non-lighted portion of the grid is also illuminated in many conventional displays. The non-lighted black colored portion of the display grid absorbs light energy illuminated thereon, and the absorbed light energy is converted to heat energy. Not only is this light not used for generating an image, but the heat build-up in the electronic display raises the operating temperature to excessive levels which may lead to damage or inoperability of the display.

It is therefore desirable to provide backlighting for a display, such as a liquid crystal display, which avoids problems associated with overheating of the display. It is further desirable to provide for backlighting for such a display which more efficiently utilizes the light energy. It is particularly desirable to provide for such backlighting for a display for use in HUD systems, such as those used in automotive vehicles.

SUMMARY OF THE INVENTION

The present invention provides for an image illumination apparatus for backlighting a portion of an electronic display. The apparatus comprises a light source for generating illuminating light, a light shielding medium located between the light source and a display, and an aperture formed in the light shielding medium for allowing the transmission of light generated by the light source to pass to a lit portion of the display. The light shielding medium prevents some of the light from being transmitted to non-lit portions of the display.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
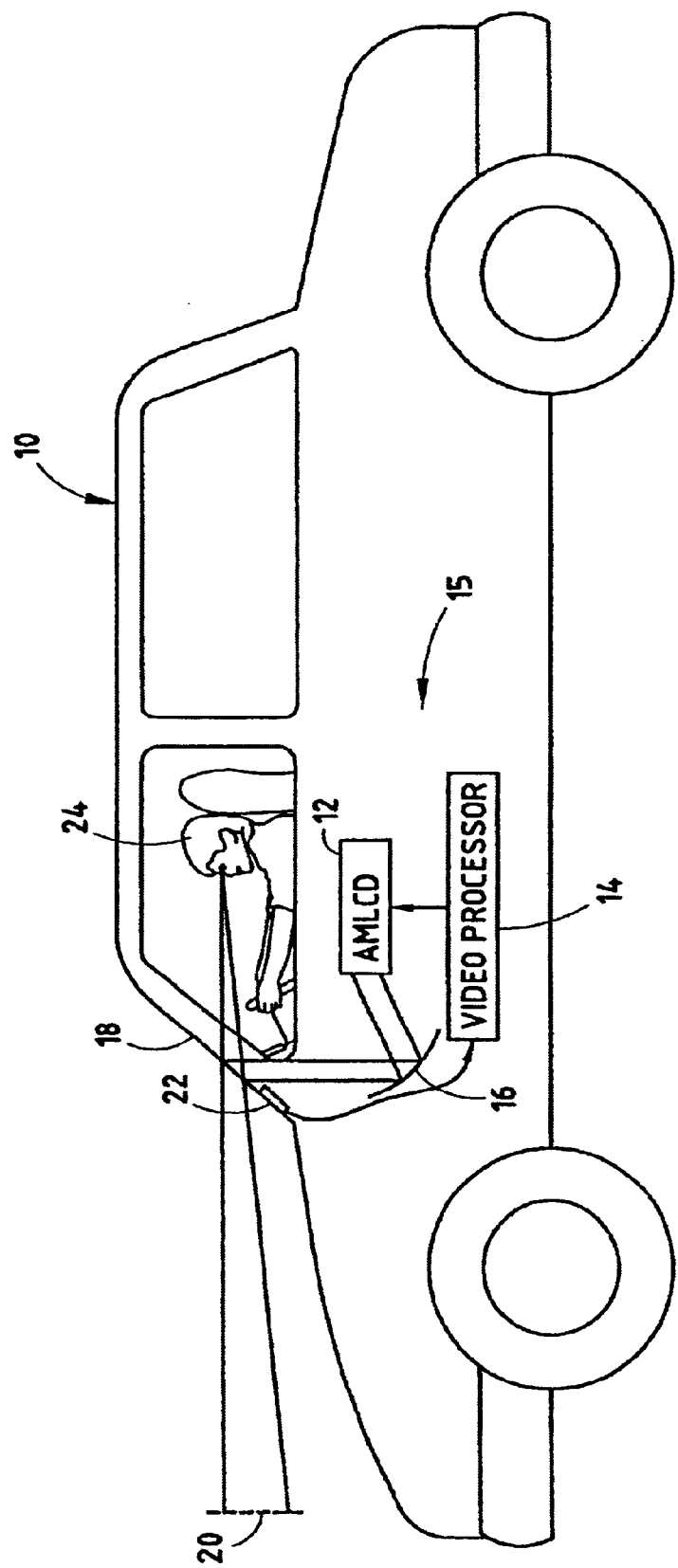
FIG. 1 is a schematic diagram of a HUD system employed in an automotive vehicle.

Referring to FIG. 1, an automotive vehicle 10 is generally shown equipped with a head up display (HUD) system 15. The HUD system 15 displays to the vehicle operator 24 one or more images 20 projected in front of the operator 24 and generally aligned with the operator's line of sight. As is evident in vehicle applications, the HUD system 15 allows the operator 24 to view the displayed image without requiring the operator to remove his/her eyes from the view through the front window 18 of the vehicle. According to the present invention, the HUD system 15 employs an image source display 12, particularly an active matrix liquid crystal display (AMLCD), having a backlighting apparatus as described herein.

The HUD system 15 generally includes a video processor 14, the image source display unit 12, a mirror 16, and a combiner or windshield 18. The video processor 14 receives data from multiple systems and sensors in the automotive vehicle 10 and formats the data into a suitable display signal that is communicated to the display unit 12. For example, data may be received from an infrared sensor for detecting objects in the roadway ahead of the vehicle, a vehicle speed sensor, engine sensors, light sensors, and GPS related data, amongst other data. The video processor 14 may be of a conventional design having a digital microprocessor, memory, and related circuitry, and therefore is not described in detail herein.

Processor 14 receives a light signal from light sensor 22 which is indicative of the sensed ambient light conditions in front of the vehicle. The processor 14 generates signals responsive to the light signal for controlling the brightness of the backlight source which illuminates the backside of the display unit 12 as described herein. In order to generate a sufficiently viewable image, the brightness of the light source may need to be adjusted depending upon the ambient light conditions. It should also be apparent that a relatively bright light source may be needed, considering the light losses that may occur at the reflection of the image off of the combiner or windshield 18.

The display unit 12 generates a lighted image and projects the lighted image from a front side of the display. Display unit 12 may be of a conventional design, except for the backlighting apparatus of the present invention. Display unit 12 includes an electronic display having a grid of pixels that may be illuminated with light from the backside to generate a lighted image on the front side. The electronic display further has a masked area that does not generate an image. One example of the display unit may include a liquid crystal display. Liquid crystal displays may employ a passive matrix or an active matrix display grid. According to a more specific embodiment, the liquid crystal display may include an AMLCD. While the present embodiment illustrates the use of an AMLCD having a backlighting apparatus according to the present invention, it should be appreciated that the display may include other types of displays employing backlighting.

Figure 2:
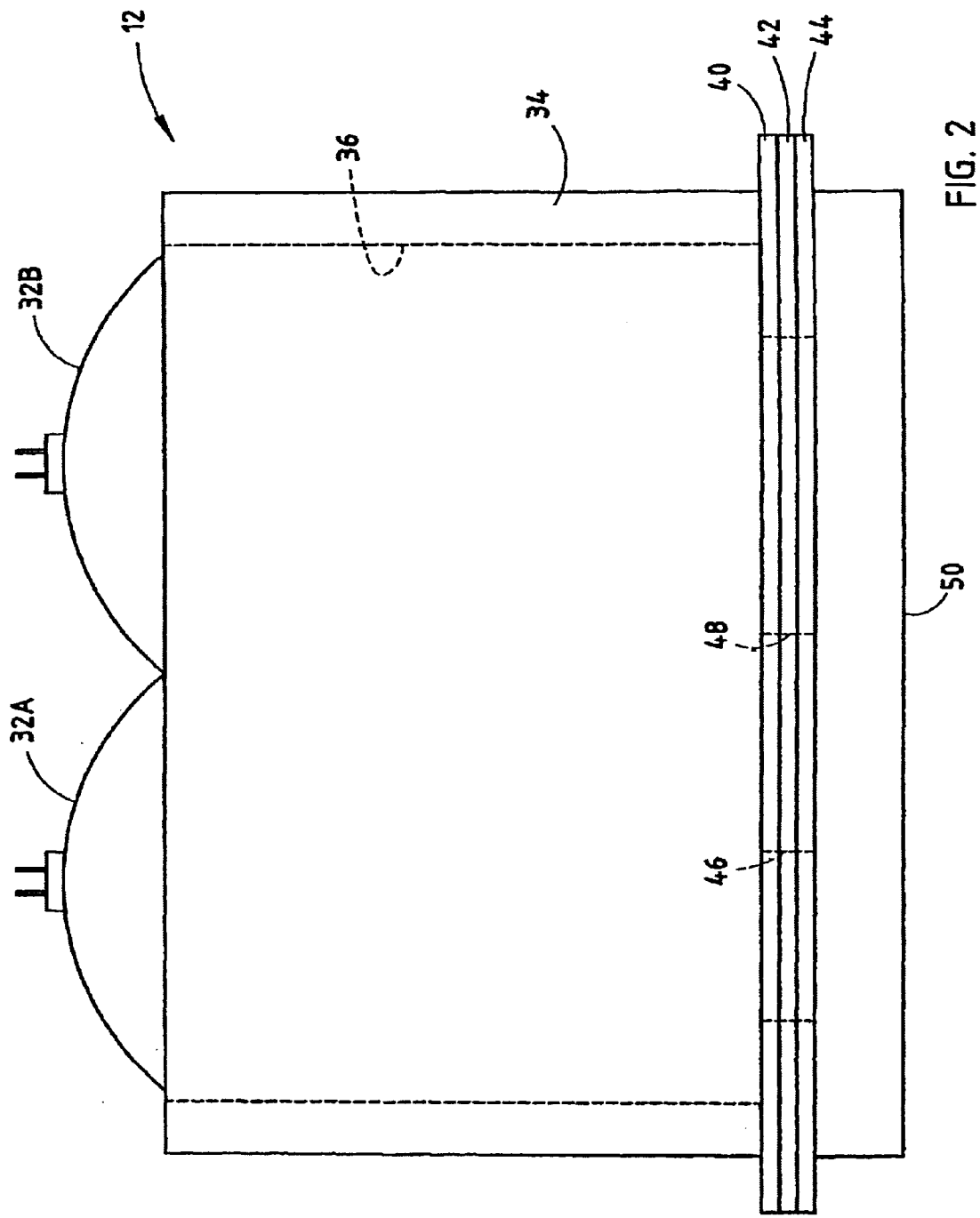
FIG. 2 is a side view of the image source display having a backlighting apparatus according to the present invention.
Figure 3:
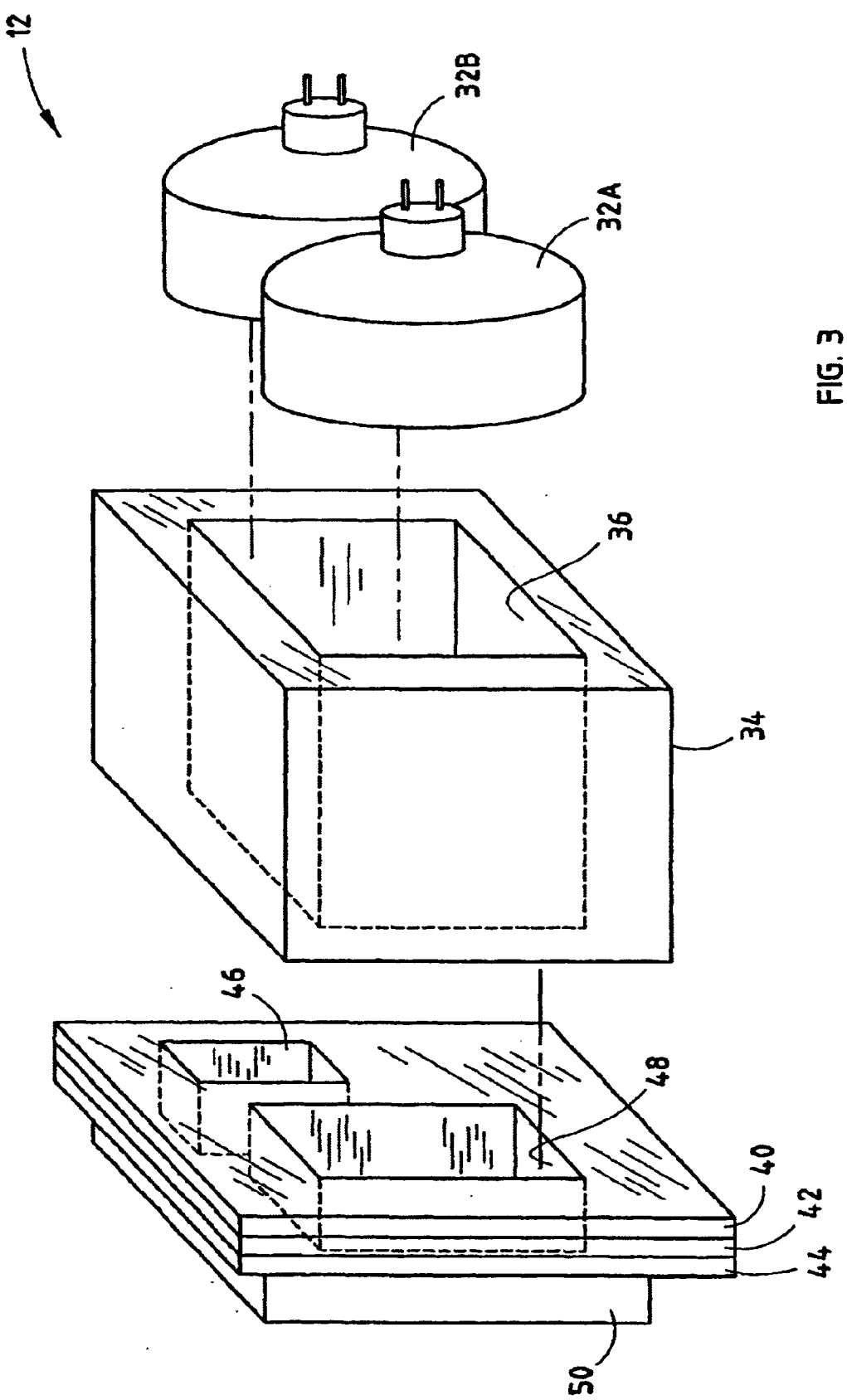
FIG. 3 is a partial exploded view of the display and backlighting apparatus shown in FIG. 2.

Referring to FIGS. 2 and 3, the backlighting apparatus 12 is shown positioned against the backside of an AMLCD 50. The backlighting apparatus 12 includes a light source, such as first and second lamps 32A and 32B, for generating illuminating light. Each of the first and second lamps include a bulb supported in an elliptical reflector for shaping the light beam emitted therefrom. The first and second lamps 32A and 32B may employ halogen bulbs according to one embodiment. While the light source is shown having first and second lamps 32A and 32B, it should be appreciated that one or more lamps may be employed to generate a source of illuminating light.

The backlighting apparatus further includes a light engine 34 in optical communication with the first and second lamps 32A and 32B. The light engine 34 has inner reflective walls 36 which define a light guide for transmitting illuminating light from the lamps 32A and 32B toward the AMLCD 50. According to one embodiment, the inner reflective walls 36 define a generally rectangular shape to provide a generally rectangularly configured light guide.

Coupled between the light engine 34 and the backside of AMLCD 50 are three planar mediums 40, 42, and 44, each having first and second apertures 46 and 48 extending therethrough and aligned with one another. Medium 40 is a heat shielding reflector having a generally planar shape and a reflective surface facing lamps 32A and 32B for recycling light energy illuminated thereon. Light generated by the lamps 32A and 32B is transmitted through light guide 36. Some of the light passing through light guide 36 will pass through apertures 46 and 48, while a substantial amount of the light which illuminates the remainder of light recycling reflector 40 is reflected back into the light engine 34. Thus, the light energy may be recycled within light engine 34, until such light energy exits apertures 46 and 48.

Medium 42 is a thermal insulation layer disposed between mediums 40 and 44. The insulation layer 42 may include a high temperature polymeric or glass material, generally in the shape of a substantially flat panel. Insulation layer 42 provides thermal insulation to prevent or reduce the transfer of heat between mediums 40 and 44.

Medium 44 is a heat sink having a conductive material that physically contacts the back surface of the display grid 50 to collect and remove heat from the display grid 50 and dissipate the collected heat to the outer surrounding environment. The heat sink 44 may include a heat transmissive conductive material such as aluminum or copper and may further include radially extending arms with an enlarged surface area for effectively dissipating heat energy. Accordingly, the use of a heat sink 44 reduces the heat energy generated at the display grid 50, thus preventing overheating of the display.

It should be appreciated that each of mediums 40, 42, and 44 has apertures 46 and 48 extending therethrough so as to allow for the transmission of illuminating light to pass from the light engine 34 through apertures 46 and 48 to only designated lighted areas at the backside of display grid 50 which are intended to be lit to provide displayed images. The remaining non-lighted area of the display grid is masked so as not to receive light or display a light image. Thus, by only lighting those portions of the backside of display grid 50 that are intended to generate an image, the remaining portions which are not illuminated with light do not absorb light energy.

Planar mediums 40, 42, and 44 are stacked one on top another and directly against the backside of display grid 50. Thus, light passing through apertures 46 and 48 illuminates only the grid area exposed to apertures 46 and 48. According to one embodiment, the active matrix display grid 50 has a thickness of approximately 5 mils, while each of the mediums 40, 42, and 44 has an individual thickness of approximately 1 mil.

Figure 4:
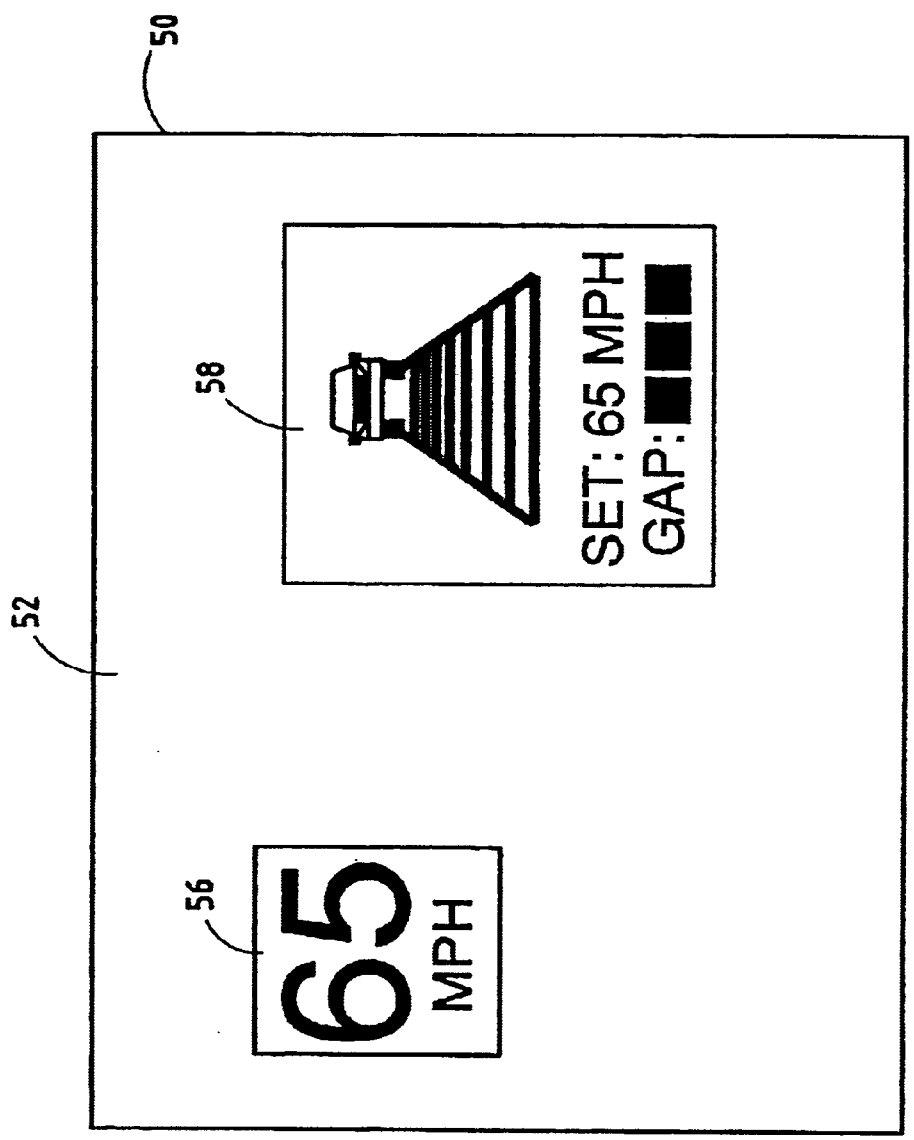
FIG. 4 is a front view of displayed images generated by the display, according to one example.

Referring to FIG. 4, one example of lighted images generated on display grid 50 are illustrated therein. According to the example shown, a first image 56 is generated by illuminating the backside of display grid 50 by transmitting light through aperture 46 to the backside of display grid 50. Similarly, a second image 58 is generated by passing light through aperture 48 to the backside of display grid 50. The size, shape, and location of images 56 and 58 are determined by the apertures 46 and 48, respectively. Accordingly, only those portions containing images 56 and 58 are illuminated with light, while the remaining portions 52 of the display are not illuminated with light. While two rectangularly shaped images 56 and 58 are shown herein, it should be appreciated that one or more images having various shapes and sizes may be employed by forming aperture 46 and 48 to have a select size and shape.

Accordingly, the backlighting apparatus of the present invention advantageously illuminates only select designated portions of the backside of display 50 with light, thereby maintaining a lower operating temperature of the display. By maintaining a lower operating temperature, it should be appreciated that increased reliability of the display may be realized. Further, by providing a heat sink as a conductive medium contacting the back surface of display grid 50, further reduced operating temperature may thereby be achieved. In addition, by directing the light to only those regions where an image is to be generated, the backlighting system efficiently utilizes the light source energy and operates with reduced power consumption.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. An image illumination apparatus for backlighting a portion of a display having a grid of pixels that are illuminated with light to generate a lighted image and a masked area that does not generate an image, said apparatus comprising:

a light source for generating illuminating light;

a light shielding medium located between the light source and a display for shielding at least some of the light from being transmitted to the masked area in a non-lighted portion of the display, wherein the light shielding medium comprises a conductive heat sink; and an aperture formed in the light shielding medium for allowing the transmission of light generated by the light source to pass to the grid of pixels in a lighted portion of the display so as to illuminate said lighted portion of the display.

2. The apparatus as defined in claim 1, wherein the light shielding medium comprises a light recycling reflector.

3. The apparatus as defined in claim 2, wherein the light recycling reflector is a substantially planar reflector.

4. The apparatus as defined in claim 1, wherein the light shielding medium comprises a thermal insulator.

5. The apparatus as defined in claim 1 further comprising a light guide disposed between the light source and the light shielding medium.

6. The apparatus as defined in claim 1, wherein the display comprises a liquid crystal display.

7. The apparatus as defined in claim 6, wherein the display comprises an active matrix liquid crystal display.

8. The apparatus as defined in claim 1, wherein said light shielding medium has a thickness of no greater than 3 mils.

9. The apparatus as defined in claim 1, wherein said image illumination apparatus is used to display one or more lighted images in a head up display system.

10. A backlit liquid crystal display comprising:

a light illuminating display having a grid of pixels that are illuminated with light to generate a lighted image and a masked area that does not generate an image;

a light source for generating light;

a light shielding medium located between the light source and the display for shielding at least some of the light from being transmitted to the masked area in a non-lighted portion of the display grid, wherein the light shielding medium comprises a conductive heat sink; and an aperture formed in the light shielding medium for allowing the transmission of light generated by a light source to pass to the grid of pixels in a lighted portion of the display grid so as to illuminate said lighted portion of the display grid.

11. The display system as defined in claim 10, wherein the light shielding medium comprises a light recycling reflector.

12. The display system as defined in claim 11, wherein the reflector is a substantially planar reflector.

13. The display system as defined in claim 10, wherein the light shielding medium comprises a thermal insulator.

14. The display system as defined in claim 10, wherein the display comprises an active matrix liquid crystal display.

15. The display system as defined in claim 10, wherein the light shielding medium has a thickness of no greater than 3 mils.

16. The display system as defined in claim 10, wherein said image illumination apparatus is used to display one or more lighted images in a head up display system.

17. The display system as defined in claim 10 further comprising a light guide disposed between the light source and the light shielding medium.

18. A method of backlighting one or more select portions of a display having a grid of pixels that are illuminated with light to generate a lighted image and a masked area that does not generate an image, said method comprising the steps of:

generating light for illuminating a display;

shielding at least some of the light from being transmitted to the masked area in a non-lighted portion of the display;

transmitting light to the grid of pixels in a lighted portion of the display so as to illuminate said lighted portion of the display; and removing heat from the display via a conductive heat sink.

19. The method as defined in claim 18, wherein said step of shielding at least some of the light comprises reflecting said some of the light via a light recycling reflector.

20. The method as defined in claim 18 further comprising the step of insulating the light shielding medium from the display.

21. The method as defined in claim 18, wherein said display comprises a liquid crystal display.

22. The method as defined in claim 21, wherein the display comprises an active matrix liquid crystal display.

23. The method as defined in claim 18, wherein said step of shielding uses a shielding medium having a thickness of no greater than 3 mils.

24. The method as defined in claim 18 further comprising the step of displaying one or more lighted images generated on the display in a head up display system.

25. The method as defined in claim 18 further comprising the step of transmitting light from a light source through a light guide to a light shielding medium.

* * * * *